United States Patent [19]
Huster, deceased et al.

[11] 3,800,953
[45] Apr. 2, 1974

[54] ROTARY DRUM VACUUM FILTER

[75] Inventors: Edward A. Huster, deceased, late of Salt Lake City, Utah by Jeanne Peterson Huster, administratrix; Robert M. Janchus; Steven S. Davis, both of Bountiful; Kent L. Davis; Ralph O. Hawkes, both of Salt Lake City, all of Utah

[73] Assignee: Envirotech Corporation, Salt Lake City, Utah

[22] Filed: July 10, 1972

[21] Appl. No.: 270,496

[52] U.S. Cl. ............................................... 210/401
[51] Int. Cl. ............................................. B01d 33/14
[58] Field of Search .......... 210/400, 401, 402, 403, 210/404

[56] References Cited
UNITED STATES PATENTS

| 2,583,698 | 1/1952 | Komline | 210/401 X |
| 3,096,279 | 7/1963 | Komline | 210/401 X |
| 3,175,691 | 3/1965 | Watson | 210/404 |
| 1,892,306 | 12/1932 | Hillier | 210/404 |
| 3,615,023 | 10/1971 | Barnebl et al. | 210/401 |
| 2,652,927 | 9/1953 | Komline | 210/401 |
| 2,615,575 | 10/1952 | Wright | 210/401 |
| 3,667,614 | 6/1972 | Komline | 210/401 |

Primary Examiner—Samih N. Zaharna
Assistant Examiner—T. A. Granger
Attorney, Agent, or Firm—Robert R. Finch; Robert E. Krebs

[57] ABSTRACT

The sidewall of a rotary filter drum is provided with raised, perforate decking across which is formed a plurality of parallel grooves encircling the drum. Loops of filter medium are trained about the drum and rollers spaced therefrom. The loops are in a single layer and seat in the grooves to thereby be maintained in parallel, spaced-apart relationship. Division strips are provided longitudinally across the drum between sections of the decking to seal against the loops of filter medium between said sections. A circumferential seal is provided about the drum ends to stop leakage from the edges of the decking section while allowing expansion of the decking. An adjustable device is provided for tensioning the loops and for discharging cake therefrom.

2 Claims, 10 Drawing Figures

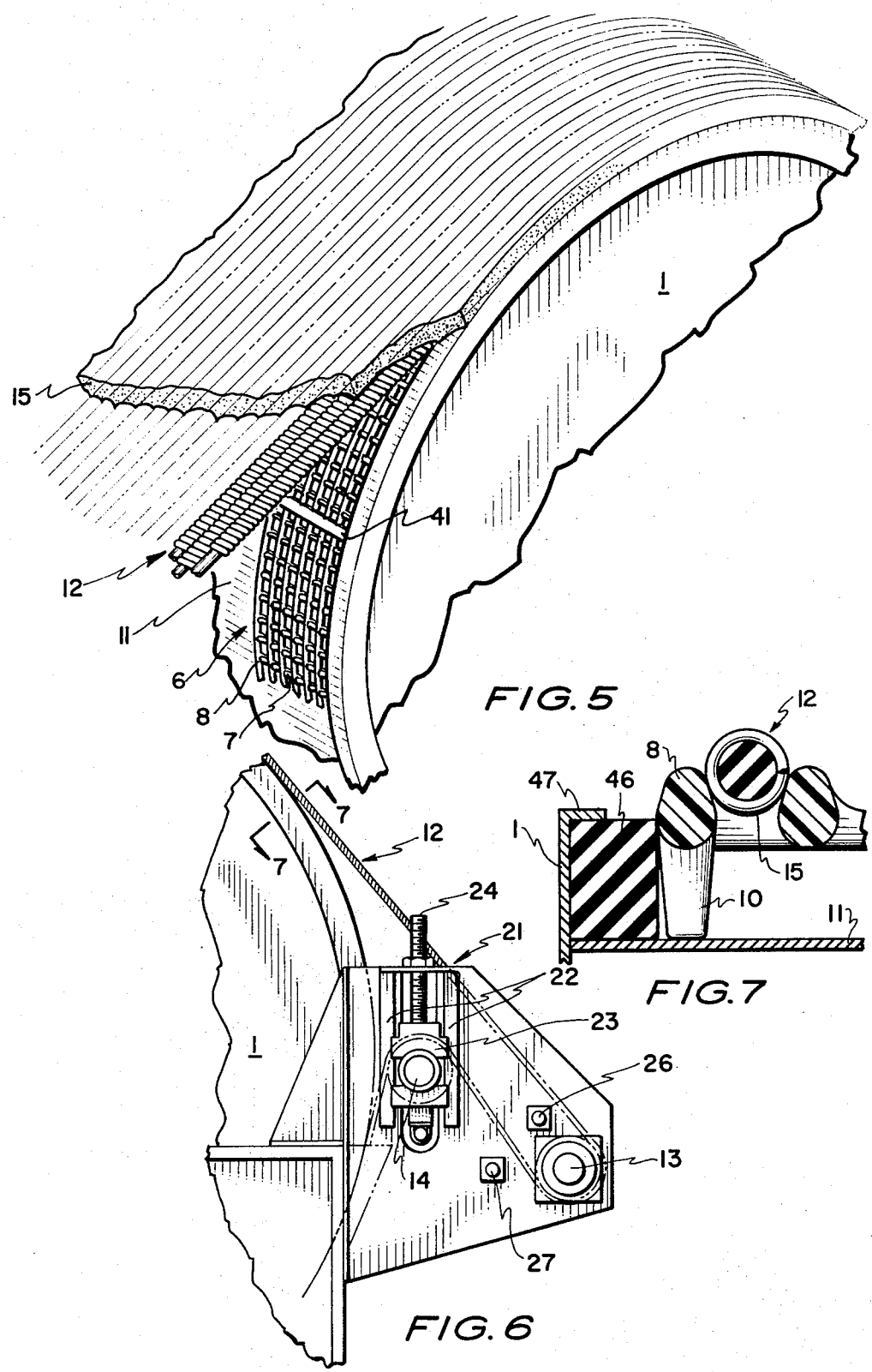

ROTARY DRUM VACUUM FILTER

DISCUSSION OF PRIOR ART

Vacuum filtration denotes the removal of suspended solids from a liquid by applying a vacuum across a porous filter medium which retains the solids but allows liquid to pass through. A basic drum filter for vacuum filtration includes a horizontally disposed drum supported for rotation while partially immersed in a liquid bath. As the drum rotates through the bath, liquid is drawn by vacuum across the filter medium which covers the successively immersed sectors of the drum and, consequently, a cake of solids is built on the medium. Some such drum filters utilize a filter medium which is fixed over the curved surface of the drum and cake is removed therefrom by a reduction in the vacuum usually aided by elongated scraping blades. Alternatively, a so-called "string discharge" may be used to discharge cake from the fixed filter medium. In that type of discharge, a single layer of spaced-apart loops of textile cord are trained between the drum and rollers spaced therefrom and, as the drum rotates, the strings carry the cake to discharge over the rollers. The strings perform no filtration function but merely hold the cake.

In other drum filters, an endless belt of filter medium is trained about the drum and remote rollers. The belt covers the drum both in submergence whereby a cake is formed and during a further dewatering and drying period upon emergence; but, thereafter the belt leaves the drum to carry the solids to discharge over the rollers. On such structures the curved surface of the drum is usually divided into longitudinal sectors by fixed division strips. Accordingly, isolated filtration chambers are formed to which vacuum is applied by tubes opening thereinto through the curved sidewall. The division strips provide a seal between adjacent sectors when one sector is covered by the belt and the adjacent sector is partially uncovered and thereby prevent excessive air leakage between sectors.

Instead of a belt, some prior filters utilized side-by-side endless loops of stiff coiled springs or the like trained over the drum. In such arrangements, the springs are always contiguous (i.e., touching) to provide a continuous medium. Some such filters employ multiple layers of loops.

OBJECTS OF THE INVENTION

An object of the invention is to provide a rotary drum vacuum filter utilizing a single layer of endless loops of filter medium with increased effective filtration area with fewer loops.

Yet another object is to provide drainage decking for a rotary drum filter adopted to maintain loops of filter medium aligned on the drum.

Still another object is to provide, in a rotary drum vacuum filter of the type employing drainage decking, improved means to seal between the edges of the heads of the drum and the decking while allowing thermal expansion and/or contraction of such decking.

A further object is the provision of improved decking division strips for use on a rotary drum filter utilizing loops of filter medium.

And still another object is to provide, on a rotary drum filter utilizing loops of filter medium, an improved auxiliary roller system including tensioning and washing means.

BRIEF DESCRIPTION OF THE DRAWINGS

The aforementioned and other objects and advantages of the invention may be readily ascertained from the following description and appended drawings which are offered by way of illustration and not in limitation of the invention, the scope of which is defined by the appended claims and equivalents rather than any preceding description.

In the drawings:

FIG. 5 is a fragmentary pictorial view of filter medium leaving the drum of the filter of FIG. 1;

FIG. 6 is an end elevation of the filter of FIG. 1 shown incorporating additional mechanism;

FIG. 7 is a sectional view taken generally along the line 7—7 in FIG. 6 viewed in the direction of the arrows; the view is enlarged for clarity and shows, inter alia, one embodiment of an end seal for use on the filter of FIG. 1;

DETAILED DESCRIPTION

Figure 1:
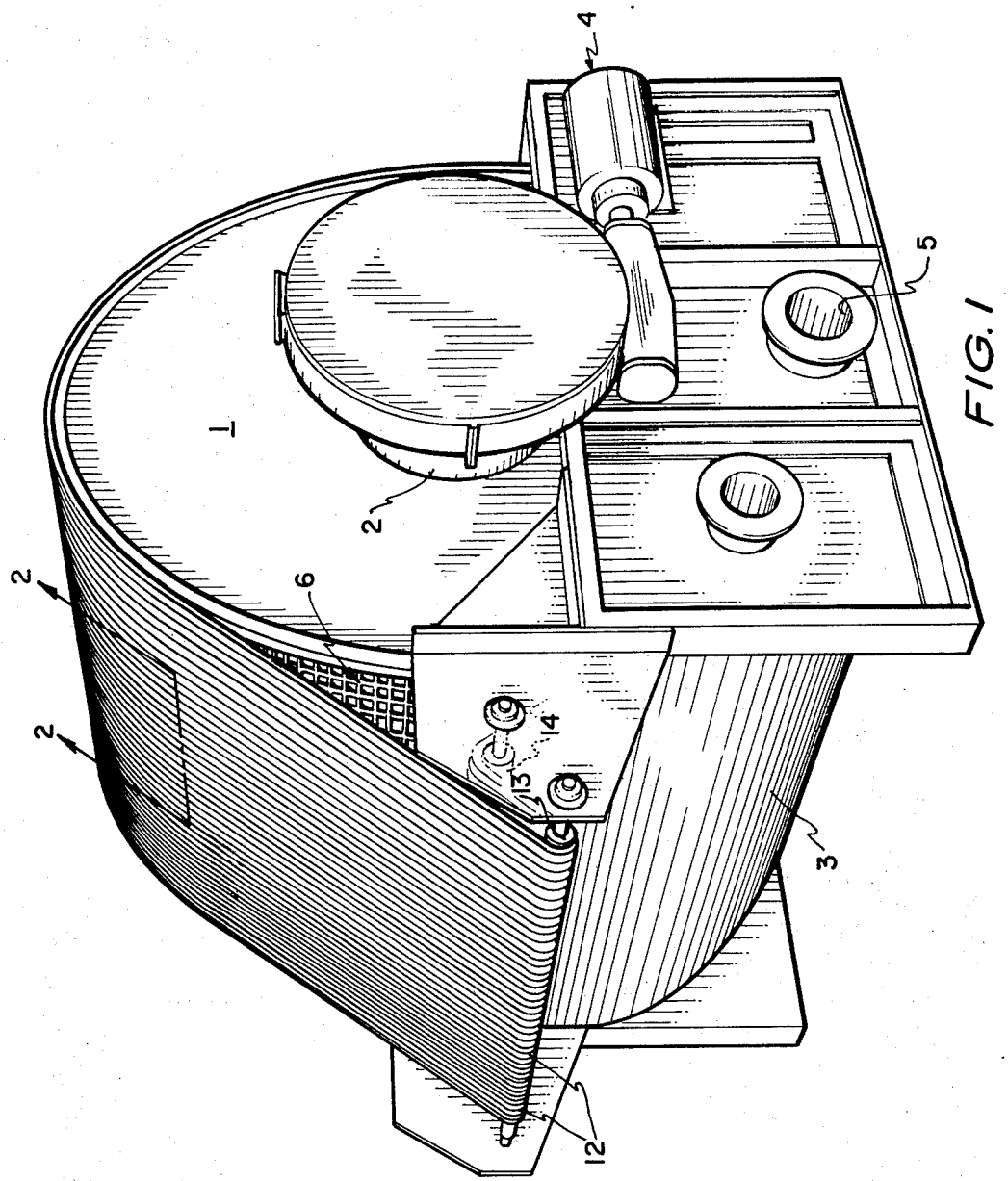
FIG. 1 is a pictorial view of a rotary drum vacuum filter employing the invention.

A basic rotary drum vacuum filter (FIG. 1) includes a drum 1 supported for partial immersion in a tank 3 by trunnions 2 axially extending from both of the heads of the drum. The drum is driven to rotate by an appropriate drive means 4 which turns one of the trunnions. A feed of solids-bearing liquid to be filtered (e.g., a slurry) is introduced to the tank through appropriate inlets 5. The sidewall of the drum is covered by sections of drainage decking generally designated 6. Loops 12 of filter medium (e.g., coiled springs, special textile cords, plastic filaments, or the like) are trained in tension about the drum and small diameter auxiliary rollers 13 and 14 which are spaced from the drum. The loops are arranged to have a substantial amount of wrap around the drum and to contact the drum sectors which are submerged in slurry in the tank. Roller 13 is a discharge roller and roller 14 is a tensioning or takeup roller.

In one embodiment (FIGS. 2, 3 and 5), each section of decking comprises a perforate grid of intersecting ribs 7 and 8 which run, respectively, transversely and circumferentially relative to the drum surface and are of generally equal height. The interstices defined by the intersecting ribs provide open passages for liquid flow. Such decking may be readily molded of plastic or similar materials which are slightly resilient. This decking is generally referred to as being of the under-drainage type; that is, the grid sections have integral spaced-apart supporting legs 10 which raise the grid above the sidewall 11 of the drum and drainage occurs across the sidewall between the legs.

In another embodiment (FIG. 8), each section of drainage decking (here designated 16) comprises circumferentially-running ribs 17 fixedly supported on integral transverse base members 18 which raise the ribs off the drum sidewall. Elongated slots 19 are formed between each of the ribs 17 in at least one of the sectors defined between the transverse members 18; the elongated slots provide passages for liquid through the decking. This drainage decking 16 is of the top-drainage type as drainage occurs on the decking surface.

Figure 2:
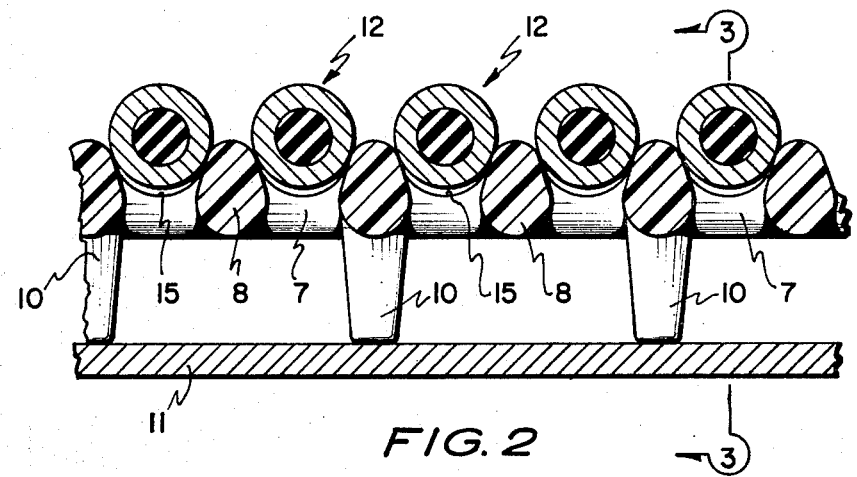
FIG. 2 is a sectional elevation taken generally in the plane of the line 2—2 of FIG. 1 and viewed in the direction indicated by the arrows; the view is enlarged for clarity and shows, inter alia, a portion of one embodiment of a drainage deck for use on the filter of FIG. 1.
Figure 3:
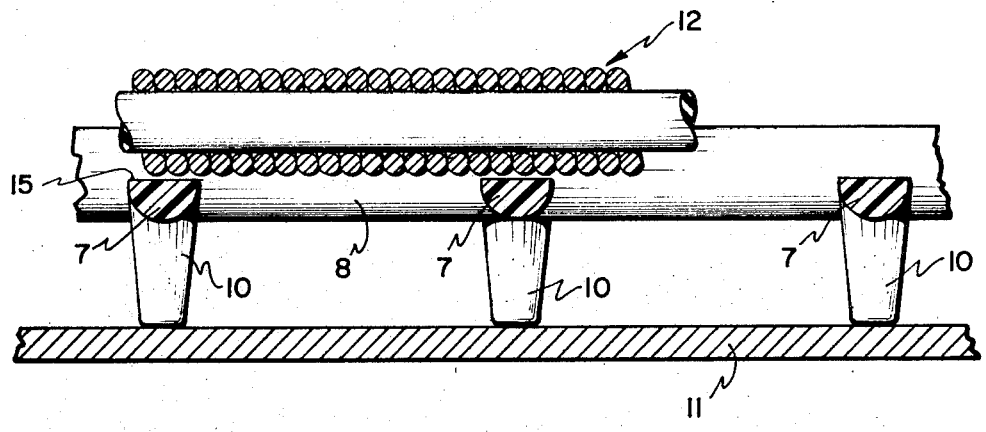
FIG. 3 is a sectional view taken in the plane of the line 3—3 in FIG. 2 looking in the direction indicated by the arrows.

In the embodiment of the decking of FIGS. 2, 3 and 5, finitely spaced-apart grooves 15 are formed, as by molding, across the transversely-running ribs 7 and the grooves are aligned from rib to rib thereby forming parallel rings of grooves which encircle the drum so that, when a single layer of loops of filter medium is utilized, such loops are maintained parallel and finitely spaced from one another by the grooves. That is, one loop of filter medium rests in each groove and is spaced from its neighboring parallel loops. The illustrated spacing of the grooves 15 is such that a circumferentially-running rib 8 is intermediate between each of the loops and those ribs protrude above the grooved transversely-running ribs 7. The intermediate ribs 8 perform no filtration per se but provide a base on which cake rests as filtrate is diverted laterally to and through the filter medium loops. Filtration is then effected as the filtrate passes through the filter medium loops.

The grooves 15 are of a depth less than one-half the diameter of the cross-section of the coil spring. With this dimension, more than one-half of the cross-sectional circumference of each of the loops lies above the grooves and the effective filtering area of the layer of medium is significantly increased. FIG. 5 shows a cake 15 of filtered solids being carried from such decking to discharge by the spaced-apart loops of filter medium.

Figure 8:
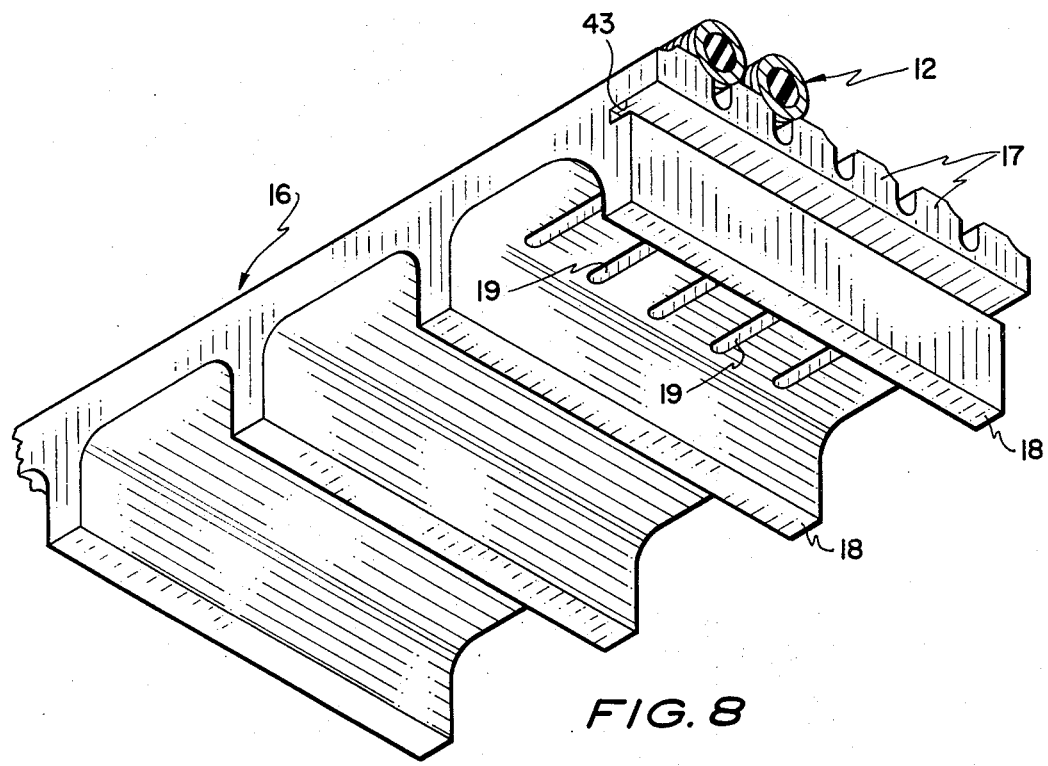
FIG. 8 is a pictorial view, partially cutaway, of a modified drainage deck viewed from the bottom thereof.

In the modified decking shown in FIG. 8 the loops of filter medium are held in the circumferentially running spaces between the ribs 17. The loops are maintained parallel and finitely spaced from one another by the grooves. In the illustrated decking, the longitudinal edges of the ribs 17 are contoured to fit the coil. The spacing of the ribs and the countouring of their edges is arranged such that more than one-half of the cross-sectional circumference of each of the filter medium loops lies above the grooves to provide a large filtering area per loop.

In FIG. 6, a takeup roller 14 is journalled in an adjustable tensioning assembly, generally designated 21. One assembly is provided at each end of the roller 14 and comprises tracks 22, a journal member 23 mounted to ride thereon and a screw member 24 moving the journal member to and fro on the tracks. Although the screw 24 is the illustrated means of adjusting tension, a pneumatic piston or the like may be utilized instead to achieve continuous tensioning. Spray nozzles 26 and 27 are provided to wash the filter medium filaments as they pass between rollers 13 and 14.

Figure 4:
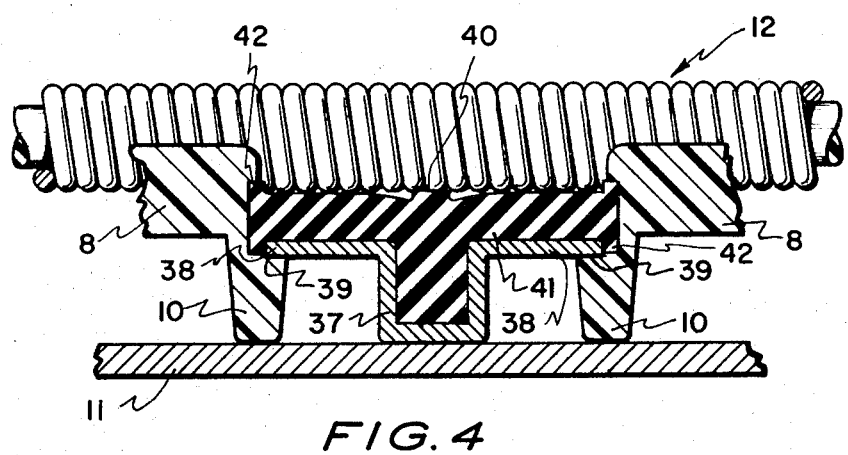
FIG. 4 is a partial sectional view of one form of division strip designed for use between sections of the drainage decking shown in FIGS. 2 and 3.
Figure 9:
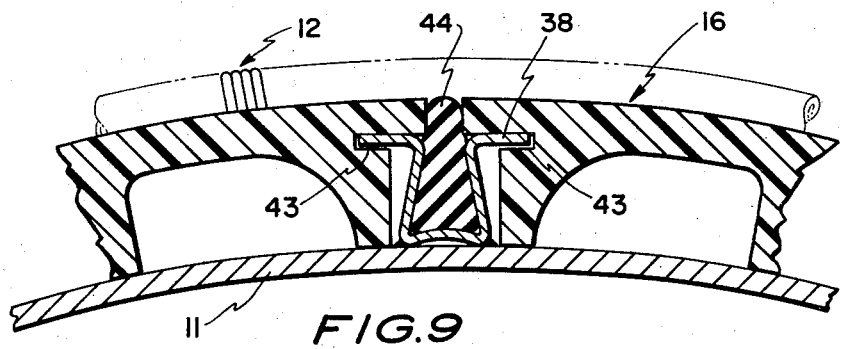
FIG. 9 is a partial sectional view similar to FIG. 4 but illustrating a modified division strip.
Figure 10:
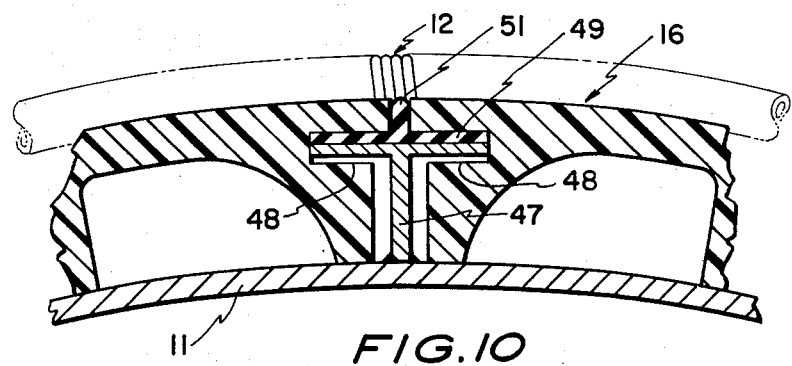
FIG. 10 is a partial sectional view again similar to FIG. 4 but illustrating yet another modified division strip.

Various alternative division strip arrangements, as shown in FIGS. 4, 9 and 10, are advantageously utilized with the previously-described decking. The division strips shown in FIGS. 4 and 9 comprise a channel 37 fixed in upright position longitudinally across the drum sidewall 11. Flanges or wings 38 are integral with the channel and extend outwardly from the top of the legs of the channel parallel to the drum sidewall 11.

In FIG. 4 the longitudinal edges of the decking sections are notched at 39 and are slipped below the horizontal wings 38 so as to be clamped into position against the sidewall 11 of the drum. A generally T-shaped elastomeric insert 41 (formed of low durometer extruded rubber, for example) is fitted in upright position into the U-shaped channel so that the cross of the "T" rests upon the wings and the upright leg of the "T" fits down into the channel. The insert runs the length of the channel 37 traversely across the drum sidewall. The upright leg of the insert 41 maintains the sides of the channel 37 forced apart to maintain pressure against the decking edges. The cross-member of the "T" is of substantial thickness to extend to or slightly above the bottom of the grooves 15 formed in the decking. Thus, the overlying loops of filter medium bear upon the cross member to further maintain pressure on wings 38 to retain the decking in position. Each of the ends of the cross-member of the "T" may be provided with opposed vertically extending nubs 42 which seal between the notches 39 in the deck and the loops of filter medium. A bead 40 may be formed longitudinally along the top of the insert to still further seal against the filter medium loops and provide additional concentrated pressure on the vertical leg thereby enhancing the spreading action within the channel. In this division strip arrangement, as in the others, an effective seal is provided between adjacent sectors when the filter medium loops overlie the division strip.

As previously noted, the division strip arrangement illustrated in FIG. 9 also utilizes the winged channel 37. However, in the modification shown in this figure the decking edges have slots 43 formed thereinto and the wings 38 slip into the slots. An elastomeric insert 44 runs the length of the channel 37 and is somewhat similar to the previous described insert 41. However, the insert 44 is oblong in cross-section; its base is wide enough to substantially fill the channel and, in height, it extends about to the surface of the decking. Thus when a loop of filter medium 12 overlies the insert, the upper end of the division strip is pushed down and spreads to sealingly fill the space between the adjacent edges of the decking sections.

FIG. 10 shows yet another division strip arrangement; this arrangement is not, however, the preferred embodiment. In FIG. 10, the previously described channel 37 has been replaced by a T-member 47 which extends transversely across the drum sidewall and is fixed thereto in upright position. The top of the T-member 47 is generally parallel to the drum sidewall 11 and fits into slots 48 formed in the adjacent decking edges; these slots are substantially the same as the slots 43 formed in the decking section shown in FIG. 9. The elastomeric insert 49 shown in this embodiment is an inverted T-shaped member which is placed in an inverted position on the top of the T-member 47 and whose leg 51 extends substantially up to the surface of the decking. When the filter medium loops 12 overlie the division strip, the leg 51 is deformed to sealingly fill the space between the adjacent decking sections.

FIG. 7 illustrates an arrangement for sealing the sides of the underflow drainage decking sections against the drum heads. The drum head or endwall 1 extends radially past the drum sidewall 11 and includes an inwardly directed flange portion 47. An elongated resilient member 46, which is rectangular in cross-section, is fitted under the flange. The resilient insert is compressed between the endwall extension and the sides of the drainage decking sections, in particular the decking legs 11. The periphery of the decking is then sealed against fluid leakage and the seal accommodates thermal expansion and contraction of the decking.

We claim:

1. In a rotary drum filter of the type having a plurality of endless loops of filter medium trained about the drum and rollers spaced therefrom, each of said loops being adapted to pass filtrate but retain solids on its surface; the improvement comprising drainage decking fixed to cover the sidewall of the drum, said drainage decking being open to permit passage of filtrate and having a plurality of parallel, circumferential grooves formed thereabout said grooves being separated by circumferential ribs so that loops of filter medium are seated in a single layer in said grooves with ribs therebetween thereby to be maintained in spaced-apart parallel relationship to one another.

2. The improvement according to claim 1 wherein said grooves are of depth less than the diameter of said filter medium loops whereby less than half of the cross-sectional circumference of the loops of filter medium lie within said grooves.

* * * * *